Figure 1:
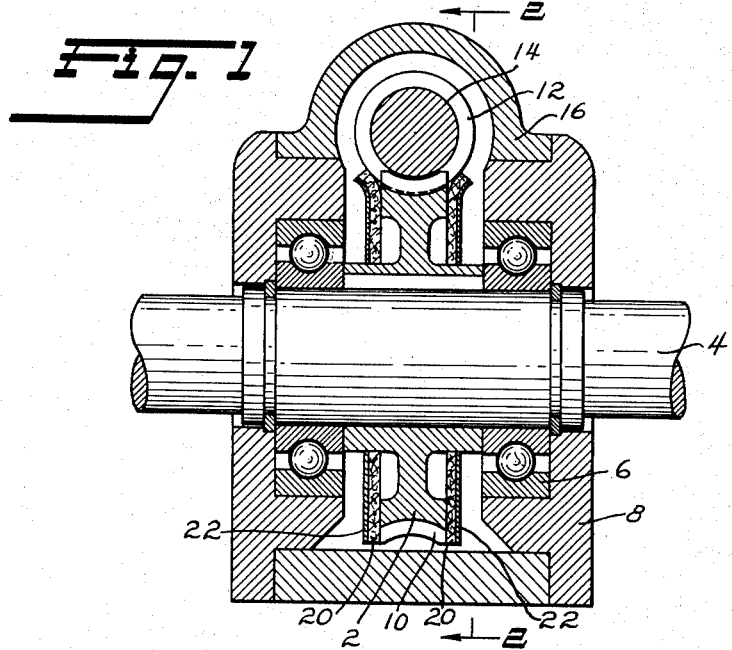

April 13, 1954   R. S. COLE   2,675,098
WORM GEAR LUBRICATION
Filed March 31, 1952

INVENTOR
RAYMOND S. COLE
BY Scrivener & Parker
ATTORNEYS

Patented Apr. 13, 1954

2,675,098

UNITED STATES PATENT OFFICE 2,675,098

WORM GEAR LUBRICATION

Raymond S. Cole, Los Angeles, Calif., assignor to Electrical Engineering and Manufacturing Corporation, Los Angeles, Calif., a corporation of California Application March 31, 1952, Serial No. 279,545

8 Claims. (Cl. 184—102)

This invention relates broadly to worm gear systems and is particularly intended to provide positive and effective lubrication of the worm and the gear teeth of such systems.

In known devices and systems for lubricating worm gearing the worm rotates in a bath of grease or other lubricant, whereby the rotation of the worm acts to force the grease lubricant outwardly and away from the gear and the gear teeth, thus preventing effective lubrication thereof. It has been an object of this invention to provide a lubricating means for a worm gear system which will be so operative that the lubricant will be applied at a point closely adjacent the point of contact between the worm and the gear teeth, whereby it will be directly applied by the worm to the gear teeth and will be continuously replenished. In achieving this object I have provided, according to one embodiment of the invention, lubricating means carried by the gear itself and engaging the worm whereby the gear teeth engaged by it will be constantly and effectively supplied with lubricant.

Other objects and features of novelty of the invention will be made apparent by the following description and the annexed drawing of an embodiment of the invention.

Figure 2:
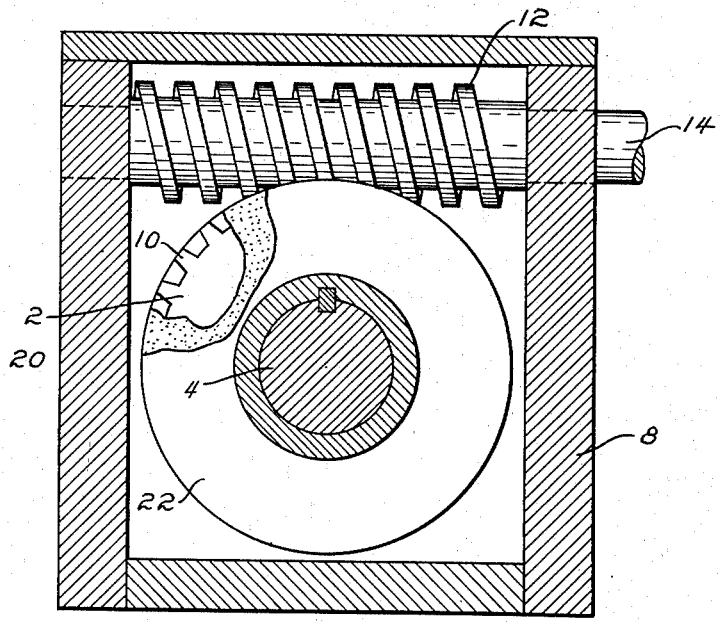

In the drawings forming part of this application,

Fig. 1 is a sectional view of a worm gear drive showing the lubricating means provided by this invention, and Fig. 2 is a view taken on line 2—2 of Fig. 1.

The worm gear drive disclosed in the drawings comprises a gear 2 mounted on shaft 4 which is rotatably mounted in bearings 6 in a casing 8. The gear teeth 10 are engaged by the worm 12 on a shaft 14 which is rotatably mounted in a part 16 of casing 8, whereby the rotation of shaft 14 is imparted to gear 2 and shaft 4. Such a worm gear drive is conventional and forms no part of my invention.

Means are provided by the invention for lubricating the worm 12 and gear teeth 10 and such means comprise two discs 20 each of which is mounted in face-to-face contact with one of the side faces of the gear 2. These discs are of sufficient diameter to extend to the outer periphery of the gear, whereby the discs engage the worm 12 as clearly shown in Fig. 1. The discs are formed of felt or other absorbent material and are impregnated with grease, oil or other suitable lubricant. Each disc is backed by a spring washer 22 which is attached to the hub of the gear and acts to press the peripheral part of the adjacent lubricating disc into engagement with the worm 12. It will be obvious that only one felt disc may be used, if desired, but it is preferred to use two, as disclosed, in order to provide better lubrication.

In the use and operation of the described device, one or more felt pads, impregnated with any suitable lubricant and backed by spring washers are attached to the gears at one or both sides thereof with the peripheral part of each in engagement with the outer surface of the worm 12. As the worm rotates it wipes lubricant from each pad and carries such lubricant with it as it engages the gear teeth 10, thus lubricating the worm and the gear teeth and the areas of contact between them.

It will be seen that, as each impregnated disc rotates with the gear, it will constantly and continuously present a new surface area to the part of the worm which it contacts, thus permitting other parts of the disc to be replenished with lubricant either from the central part of the disc or from any other reservoir. In order to improve and promote this action and function of the spring member, each of these is preferably formed as a disc of the same dimensions as the felt disc with which it is associated, as shown and is so disposed as to hold the felt disc against the adjacent side of the gear.

While I have described and illustrated one embodiment of my invention, it will be apparent to those skilled in the art to which it relates that other embodiments, as well as modifications of that disclosed, may be made and practised without departing in any way from the scope of the invention, for the limits of which reference must be had to the appended claims.

What is claimed is:

1. Lubricating means for a worm gear drive consisting of a rotatable gear and a rotatable worm in driving engagement with the teeth of said gear, comprising a member formed of impregnatable material disposed at one side of said gear and having an outer part in wiping engagement with the outer surface of said worm.

2. Lubricating means for a worm gear drive consisting of a rotatable gear and a rotatable worm in driving engagement with the teeth of said gear, comprising a member formed of impregnatable material impregnated with a lubricant disposed at one side of said gear and having an outer part in wiping engagement with the outer surface of said worm.

3. Lubricating means for a worm gear drive consisting of a rotatable gear and a rotatable worm in driving engagement with the teeth of said gear, comprising a member formed of impregnatable material impregnated with a lubricant attached to the gear at one side thereof and extending radially into wiping contact with the worm.

4. Lubricating means for a worm gear drive consisting of a rotatable gear and a rotatable worm in driving engagement with the teeth of said gear, comprising a member formed of impregnatable material disposed at one side of said gear and having an outer part in wiping engagement with the outer surface of said worm, and means constantly wiping said part of said impregnatable member into engagement with the outer surface of the worm.

5. Lubricating means for a worm gear drive consisting of a rotatable gear and a rotatable worm in driving engagement with the teeth of said gear, comprising two members each formed of impregnatable material and each disposed at one of the two sides of said gear and being impregnated with a lubricant and having the outer portion thereof in wiping engagement with the outer surface of said worm, and means associated with each of said members for constantly urging the same into engagement with the outer surface of the worm.

6. Lubricating means for a worm gear drive, consisting of a rotatable gear and a rotatable worm in driving engagement with the teeth of said gear, comprising two members each formed of impregnatable material and each disposed at one of the two sides of said gear and being impregnated with a lubricant and having the outer portion thereof in wiping engagement with the outer surface of said worm, and a spring device engaging the outer surface of each impregnated member and constantly urging the outer portion thereof into engagement with the outer surface of the worm.

7. Lubricating means for a worm gear drive consisting of a rotatable gear and a rotatable worm in driving engagement with the teeth of said gear, comprising two members each formed of impregnatable material and each disposed at one of the two sides of said gear and being impregnated with a lubricant and having the outer portion thereof in wiping engagement with the outer surface of said worm, and a spring device engaging the outer surface of each impregnated member and constantly urging the same into engagement with the adjacent face of the gear and with the outer surface of the worm.

8. Lubricating means for a worm gear drive consisting of a rotatable gear and a worm in driving engagement with the teeth thereof, comprising two discs each formed of impregnatable material impregnated with a lubricant and each being disposed in face-to-face relation with a side of the gear and extending radially in all directions to the outer periphery thereof, two spring discs each being disposed in face-to-face engagement with the outer surface of one of said impregnated discs and constantly pressing the same against the adjacent face of the gear and constantly urging the peripheral part thereof into engagement with the outer surface of the worm.

References Cited in the file of this patent

UNITED STATES PATENTS

| Number | Name | Date |
|---|---|---|
| 2,007,217 | Rose | July 9, 1935 |